(12) United States Patent
McCully et al.

(10) Patent No.: US 7,249,383 B1
(45) Date of Patent: Jul. 24, 2007

(54) METHOD OF DETECTING PIRACY OF PROPRIETARY MATERIAL

(76) Inventors: Timothy R. McCully, 16819 Grouse Moor, Houston, TX (US) 77084; Matthew N. Garner, 3414 Spring Arbor, Sugar Land, TX (US) 77479

( * ) Notice: Subject to any disclaimer, the term of this patent is extended or adjusted under 35 U.S.C. 154(b) by 925 days.

(21) Appl. No.: 10/354,302

(22) Filed: Jan. 30, 2003

Related U.S. Application Data

(60) Provisional application No. 60/352,286, filed on Jan. 30, 2002.

(51) Int. Cl.
*G06F 21/22* (2006.01)
*G06Q 99/00* (2006.01)

(52) U.S. Cl. .............. 726/28; 705/52; 705/58
(58) Field of Classification Search .............. None
See application file for complete search history.

(56) References Cited

U.S. PATENT DOCUMENTS

| | | | | |
|---|---|---|---|---|
| 6,134,659 | A * | 10/2000 | Sprong et al. | 713/190 |
| 6,363,489 | B1 * | 3/2002 | Comay et al. | 726/22 |
| 6,920,565 | B2 * | 7/2005 | Isaacson et al. | 713/193 |
| 7,024,696 | B1 * | 4/2006 | Bahar | 726/26 |
| 7,181,488 | B2 * | 2/2007 | Martin et al. | 709/200 |
| 2005/0097054 | A1 * | 5/2005 | Dillon | 705/51 |
| 2006/0048237 | A1 * | 3/2006 | Luo et al. | 726/32 |
| 2006/0100964 | A1 * | 5/2006 | Wilde et al. | 705/57 |
| 2006/0179486 | A1 * | 8/2006 | Bahar | 726/26 |
| 2007/0027809 | A1 * | 2/2007 | Alve | 705/51 |

OTHER PUBLICATIONS

Mulligan et al, "How DRM-Based Content Delivery Systems Disrupt Expectations of "Personal Use"", Oct. 27, 2003, DRM '03, p. 77-89.*
Steinauer et al, "Trust and Traceability in Electronic Commerce", Sep. 1997, StandardView, vol. 5, No. 3, p. 118-124.*

* cited by examiner

*Primary Examiner*—Christopher Revak
(74) *Attorney, Agent, or Firm*—Law Office of Tim Cook P.C.

(57) ABSTRACT

A method is provided for detecting and tracking piracy of proprietary materials marketed and distributed on various types of media and multi-media products. A particular media product is assigned a product identification number, and each copy of the media product is assigned a serial number. Each serial number may also be sequentially assigned a sequence number. A website is provided for consumers of the media product, and access to certain aspects of the website are controlled by use of a valid combination of the product identification number and a serial number, and by use of identifying information assigned for a user to each valid combination. Invalid entries prompt an information request from the website, which information is analyzed for determining potential instances of piracy. Piracy reports based on such information and such analysis may also be prepared and provided to owners or controllers of the proprietary materials.

24 Claims, 11 Drawing Sheets

Front Side

Typical Front Cover and Artwork

UPC Barcode    Go to www.albumsite.com/this_album

415

405

Back Side

Use this Information to Download the Album Bonus Material
Go to: www.albumsite.com/this_album
Disk ID: UPC Code
Serial No: ABCDEFGHIJ

410

METHOD OF DETECTING PIRACY OF PROPRIETARY MATERIAL

This application claims priority based on U.S. Provisional Patent Application Ser. No. 60/352,286, entitled "Method of Detecting Piracy of Copyrighted Material", and filed Jan. 30, 2002.

BRIEF DESCRIPTION OF THE DRAWINGS

FIG. 11 shows an illustration of a front cover for a CD/DVD case according to other embodiments of the invention.

DETAILED DESCRIPTION OF EMBODIMENTS OF THE INVENTION

Figure 1:
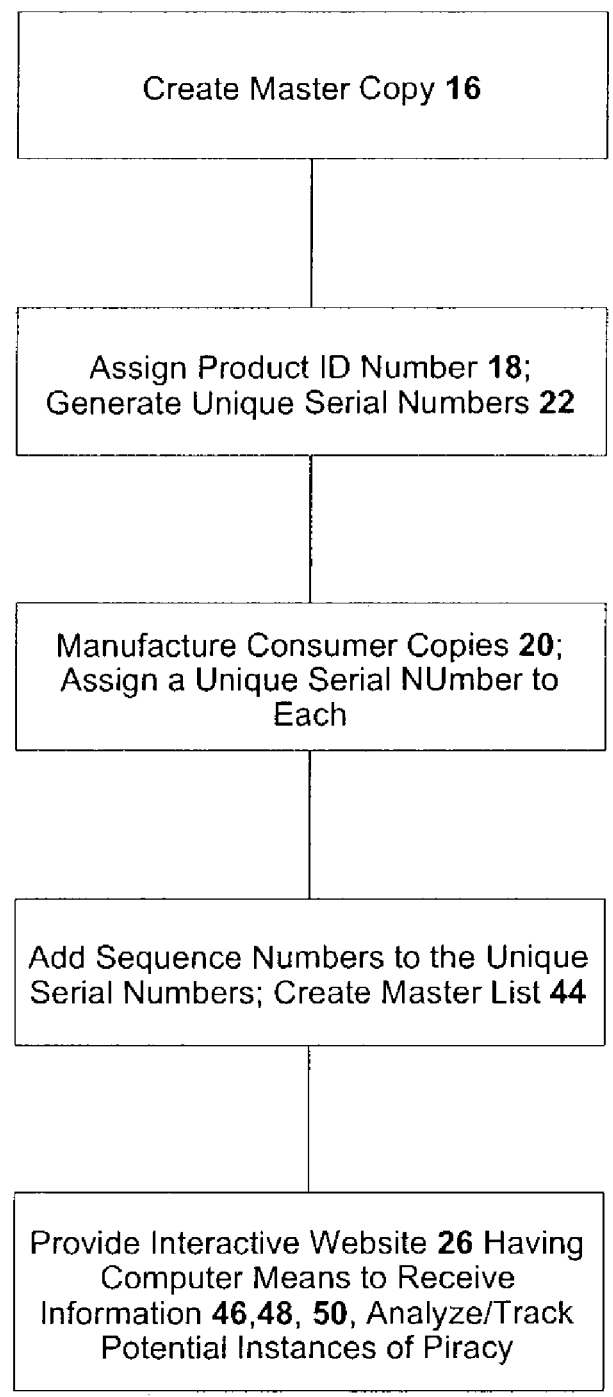
FIG. 1 shows a flow chart diagram of steps in one embodiment of the disclosed method for detecting piracy.

Referring now to FIG. 1, a method 10 for detecting piracy of proprietary material 12 sold or distributed in a media product 14 is described herein. In one embodiment, the method 10 comprises the steps of creating a master copy 16 of a media product 14 comprising proprietary material 12, assigning a product identification number 18 to the media product, manufacturing a plurality of consumer copies 20 of the media product from the master copy, generating a plurality of serial numbers 22, assigning one serial number to each consumer copy and sequentially assigning a sequence number 24 to each serial number, providing a website 26 for interfacing with users 28 interested in bonus proprietary material 30 in connection with the proprietary materials 12 on the consumer copy 20, ensuring that each user 28 has a valid product identification number 18 associated with a valid serial number 22, ensuring that each user 28 is associated with identifying information 32 assigned to the product identification number having the corresponding serial number, compiling piracy information 34 about users 28 not associated with assigned identifying information 32, and analyzing the piracy information 34 to determine and track a potential instance of piracy of the proprietary material.

Piracy is the systematic or random illegal copying of products containing proprietary material 12, such as copyrighted music, movies, software and video games. Piracy often includes the distribution of pirated products for sale as though the pirated products are original or otherwise authorized copies of the proprietary material. Products that are subject to piracy include music media products such as compact discs (CDs) and audio cassette tapes, movie media products such as digital video discs (DVDs) and video cassette tapes, multi-media products such as music CDs with video components or combined CD/DVDs, software media products such as floppy discs and CDs, "super"-CDs, DVD audio discs, memory cards, and video game media including CDs and cartridges configured for various gaming consoles. Each of these media products 14 may be adapted for use with the various embodiments of the present invention. Reference to any one or more specific media product types is for example only and is not intended to narrow or otherwise limit the scope of the embodiments of the present invention disclosed herein.

Figure 2:
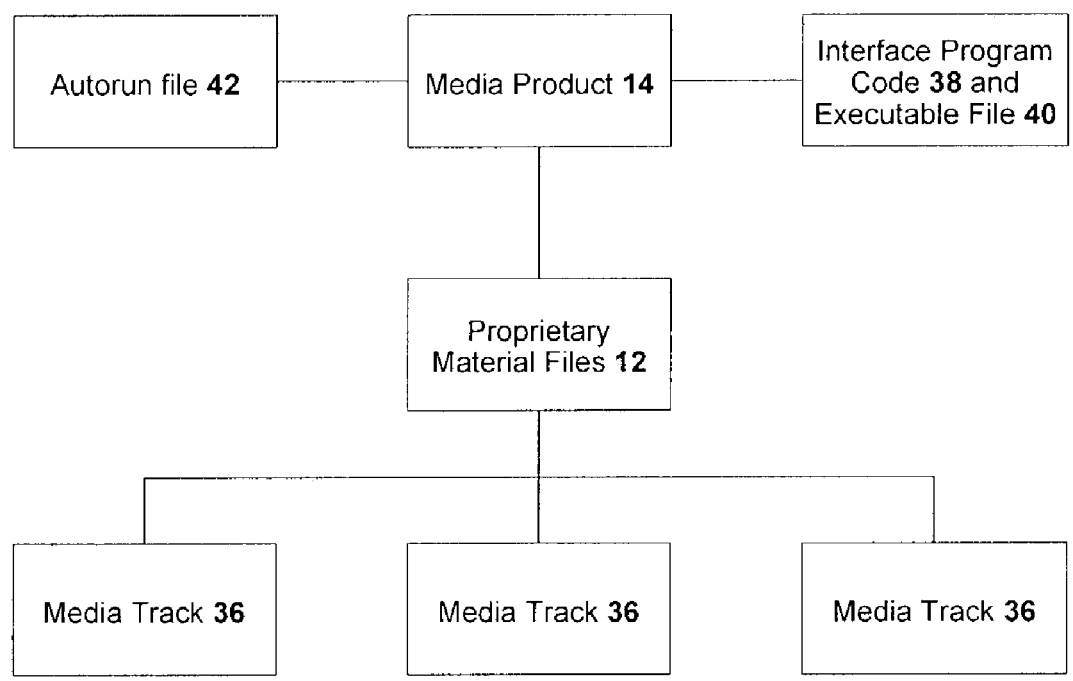
FIG. 2 illustrates a breakdown of files contained on a media product.

Referring now to FIG. 2, a master copy 16 of a media product 14 is created. The media product 14 will ultimately contain proprietary material 12 as desired, such as music, music with video, video, software, or video games. Final media tracks 36 of the proprietary material are provided, mixed and mastered and debugged as desired, for preparing the master copy. For example, a multi-media music CD (i.e. music with video clips) may contain the mastered audio tracks and video tracks for the media product as well as ancillary materials such as interviews and outtakes.

To the extent required, the final media tracks 36 are converted from their respective current formats to the format desired for the media product 14. For example, video tracks may be in analog format, and may be converted to a suitable digital format or electronic file format. Conversion methods and determinations regarding desirable conversions are within the ordinary skill in the art of creating media products.

An interface program code 38 may also be generated for each converted media track 36 to control features available on the media product 14. Such program code 38 comprises a series of program statements of software code designed to control the flow and presentation of the proprietary material using one or more media components, such as a CD player, DVD player, computer floppy disc drive, CD-ROM, or video game console, whether such components are stand-alone or incorporated in other hardware such as a computer. The interface program code 38 is compiled into an executable file 40. This file 40 comprises a control file for the media product 14. In one embodiment, program statements in the interface program code identify a web address for a "home" website as described below.

In addition to the executable file 40, one or more files 42 are also generated that enable a media component to automatically present the media product without a separate command to do so. Such a file is often referred to as an "autorun" file.

Once the final media tracks 36 are finally converted and an executable file 40 is created, the converted tracks, executable file(s) and autorun file(s) are copied together onto the master copy 16 for the desired media product 14. Once copied, the master 16 copy is finalized so that no more matter may be incorporated and no matter may be removed, protecting the integrity of the master copy.

For quality control purposes, the master copy 16 may be checked to ensure that all proprietary material 12 desired to be included in the media product 14 are indeed included and are presented properly by whatever media component is used to present it. One or more consumer copies 20 of the media product 14 from the master copy 16 may then be manufactured. In one embodiment, consumer copies 20 of a media product 14 are generally authorized when manufactured from an authorized holder of the master copy 16 thereof.

Figure 3:
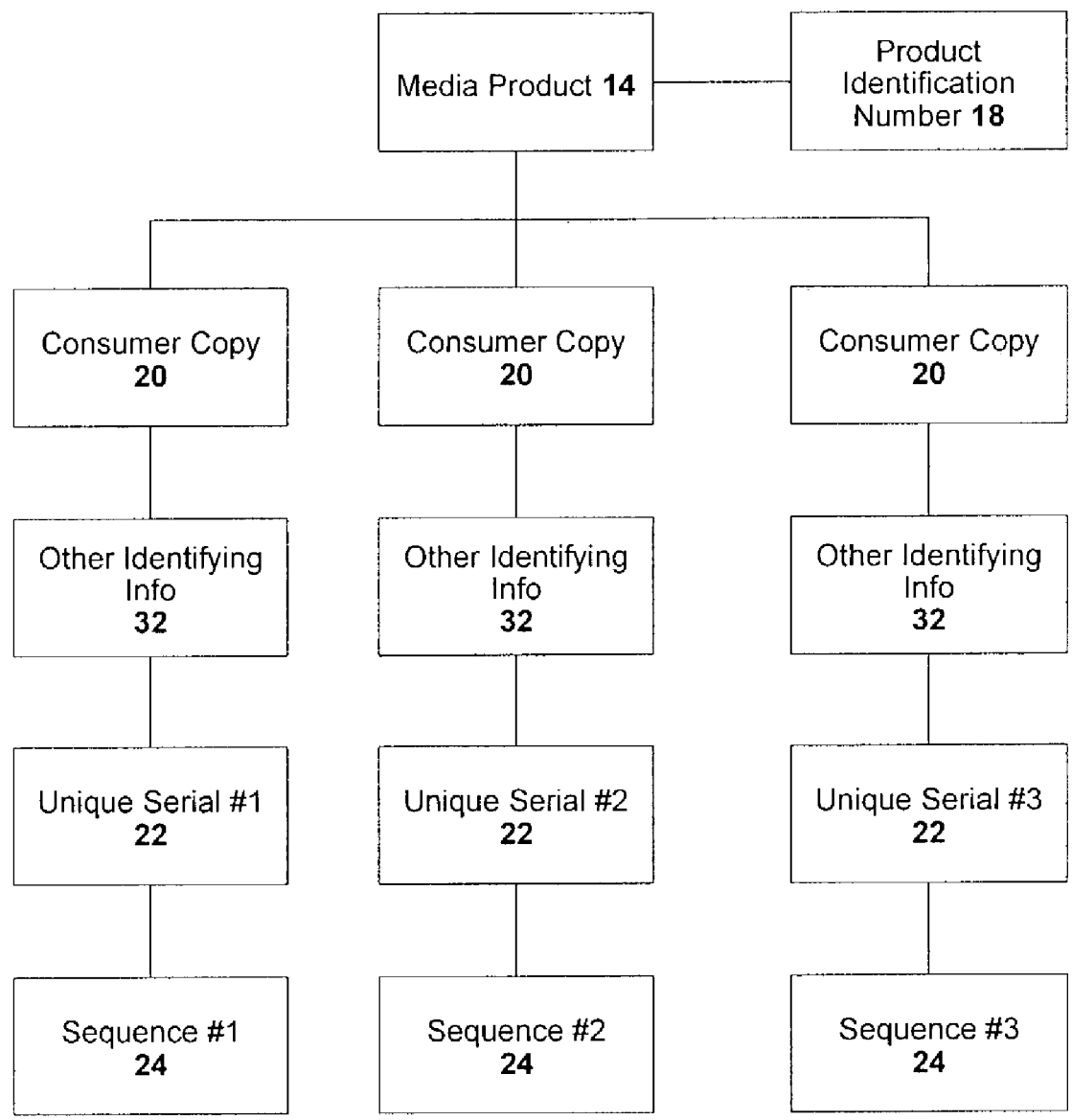
FIG. 3 illustrates numbering assignments for a media product and each consumer copy of a particular media product.
Figure 4:
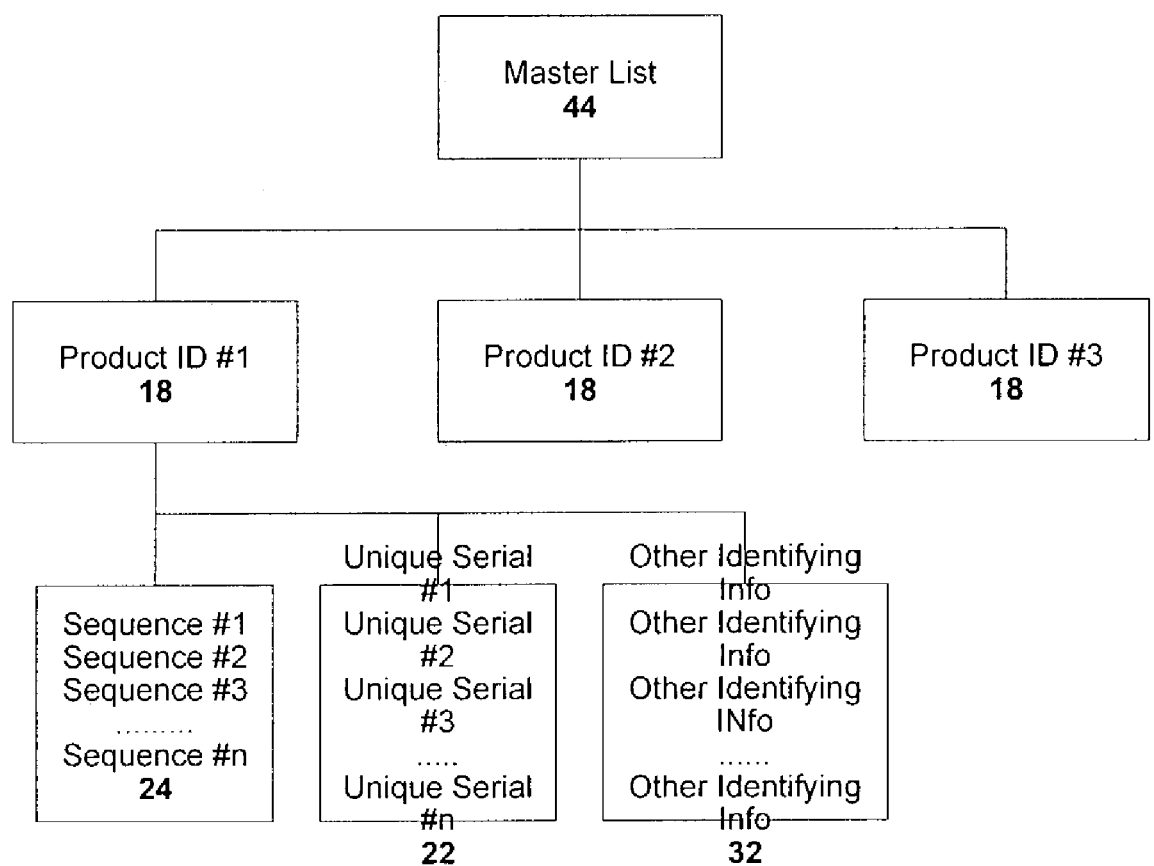
FIG. 4 is a diagrammatic illustration of a master list according to embodiments of the present invention.

Various embodiments of steps for detecting and monitoring piracy of the media product 14 are provided herein. Referring now to FIG. 3, in order to detect and monitor piracy of more than one media product 14, a product identification number 18 is assigned to each media product being monitored for piracy detection. The product identification number 18 identifies each consumer copy 20 as being a copy of the particular media product 14. Each particular media product (e.g. a particular music album, a particular video game) should have a different product identification number, although each consumer copy 20 of a particular media product 14 has the same product identification number 18. The product identification number 18 can generated using any identification number or system. In one embodiment, the product identification number 18 comprises a Universal Product Code number, commonly known as the "UPC code", which is utilized by most sales register scanners in retail establishments for identifying particular products for sale.

To identify each consumer copy 20 of a particular media product 14 distinctly from each other consumer copy, a plurality of serial numbers 22 are generated and each one assigned to a single consumer copy. In one embodiment, no two consumer copies 20 are assigned the same serial number 22. A computer program embodied in software code may be utilized for generating the serial numbers 22. In one embodiment, the serial numbers 22 comprise 10-digit numbers. In other embodiments, a large number base system is used for the serial numbers 22. For example, a binary system has a number base of two—every digit in each number comprises either zero or one. In an octal system, every digit in each number comprises either 0, 1, 2, 3, 4, 5, 6 or 7. In a decimal system, every digit in each number comprises either 0, 1, 2, 3, 4, 5, 6, 7, 8 or 9. Number base systems higher than the decimal system comprise alpha-numeric systems, utilizing a letter in the alphabet for each order greater than ten, providing number base systems between 11 and 36. For number base systems higher than 36, various symbols can be used, such as "+", "$", "/" and "%" or other symbols as desired. In one embodiment, the serial numbers 22 are generated using a number base system greater than about ten. In other embodiments, a ten digit serial number in a number base system of forty has a counting order from zero to (40)10, or $1.0485 \times 10^{16}$ potential serial numbers. A base number system higher than the decimal system may be provided for monitoring piracy of media products 14 for which the anticipated number of consumer copies 20 to be manufactured is on the order of tens of millions. For example, in one embodiment a number base of forty for serial numbers 22 having ten digits will produce a serial number having about a one in a billion chance of being duplicated.

In order to organize groupings of serial numbers 22 in an orderly fashion, a sequence number 24 may be assigned to each serial number 22 generated. A master list 44 may be provided having all product identification numbers 18 and all serial numbers 22 assigned to consumer copies 20 having a particular product identification number 18. The sequence numbering system is provided for each product identification number to numerically account for each serial number in a certain order. For example, the master list 44 may provide a data column for an eight digit integer comprising a sequence number 24, starting with the number "1" for the first generated serial number 22 and incrementing by one for each additional serial number generated. The last sequence number would then be 99,999,999. The master list 44 containing the sequence number 24 and associated serial number 22 for each product identification number 18 is stored wherever and however desired by the owner or controller of the proprietary material 12 or by the provider of piracy monitoring services using embodiments of the present invention.

The product identification number 18 and the serial number 22 for each consumer copy 20 of the media product 14 are provided with each consumer copy. The sequence number 24, in one embodiment, is retained by the owner or controller of the proprietary material 12 and/or the provider of piracy monitoring services. In other embodiments, the product identification and serial numbers 18, 22 are provided with the packaging of the consumer copy 20. In yet other embodiments, these numbers 18, 22 are printed on such packaging. In yet other embodiment, the numbers 18, 22 are printed on human readable materials, such as a slip of paper or a card, and such materials are provided with the consumer copy 20. For example, referring to FIG. 11, in an embodiment involving a particular music CD or CD/DVD as the media product 14, the album cover 400 that is inserted in the CD case provides the numbers 18, 22. The album cover insert has a front side 401 that is outwardly facing and a back side 405 that faces inwardly and is not viewable without opening the product packaging. The numbers 18, 22 may be provided 410 on the back side of the album cover insert. Alternatively, the product identification number 18 may be provided on the front side 401, as at 415, and the serial number 22 is provided on the back side 405.

In yet other embodiments, the product identification number 18 and/or serial number 22 is encoded on the media product 14 and thus is invisible to users 28 and prospective consumers. In this embodiment, the executable file 40 containing the interface program code 38 comprises control statements that interface with the website 26 (described below) to input these numbers for verifying a valid number combination to grant access to bonus proprietary material 30. As a result, the user 28 of the website 26 is not prompted to input the numbers 18, 22, rather the media product 14 is prompted or automatically inputs the numbers 18, 22 without prompting.

Figure 5:
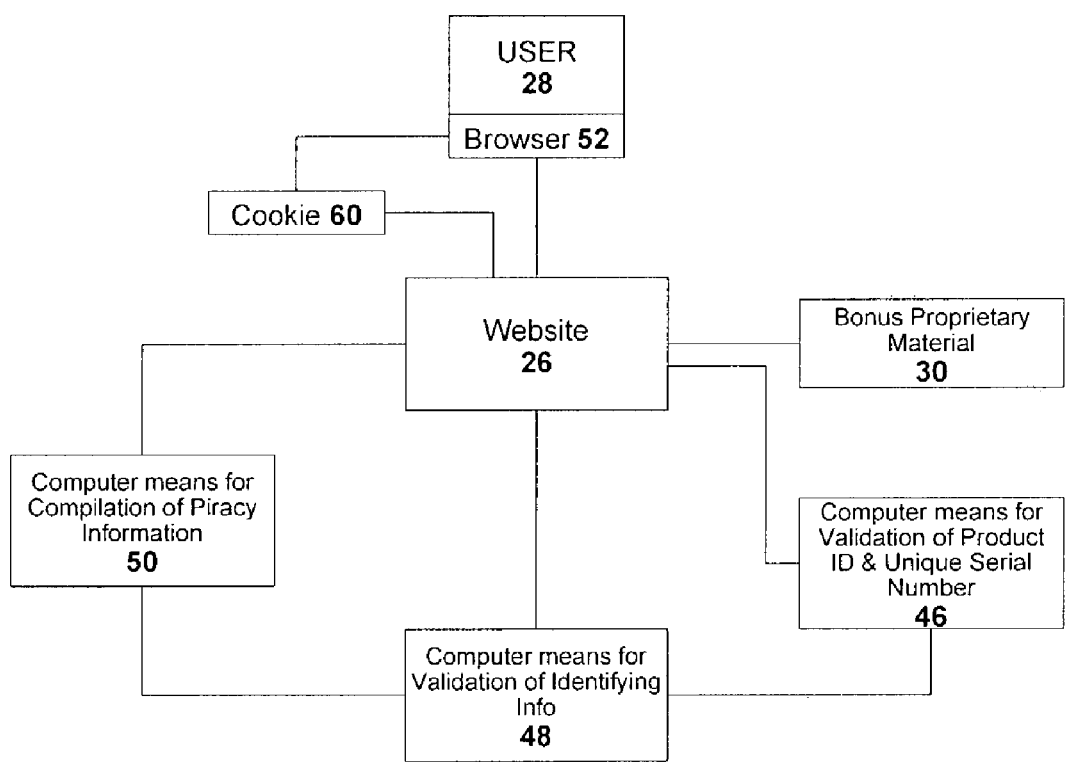
FIG. 5 is a diagrammatic illustration of a website according to embodiments of the present invention.
Figure 6:
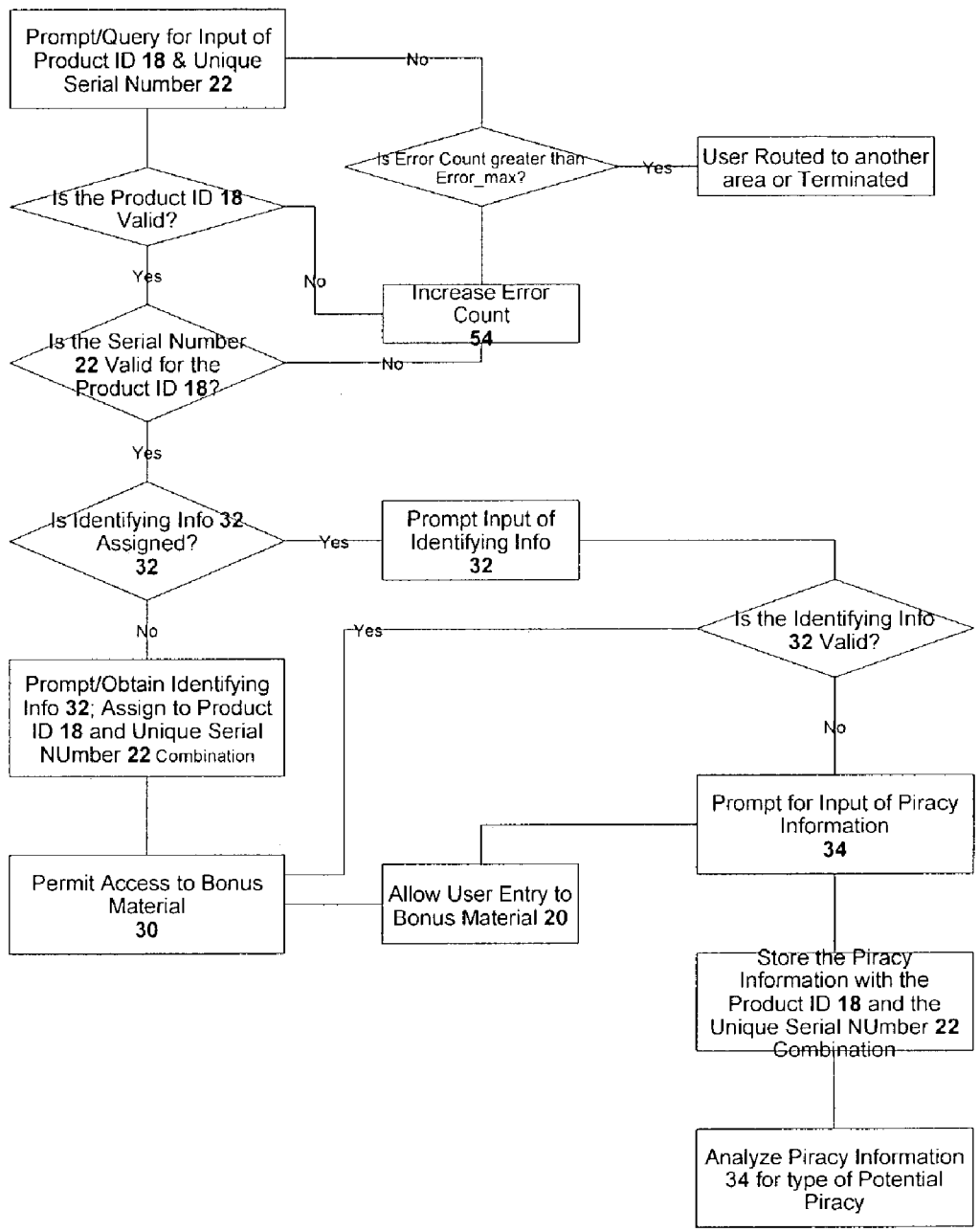
FIG. 6 is a flow chart diagram of piracy detection steps according to embodiments of the present invention.
Figure 7:
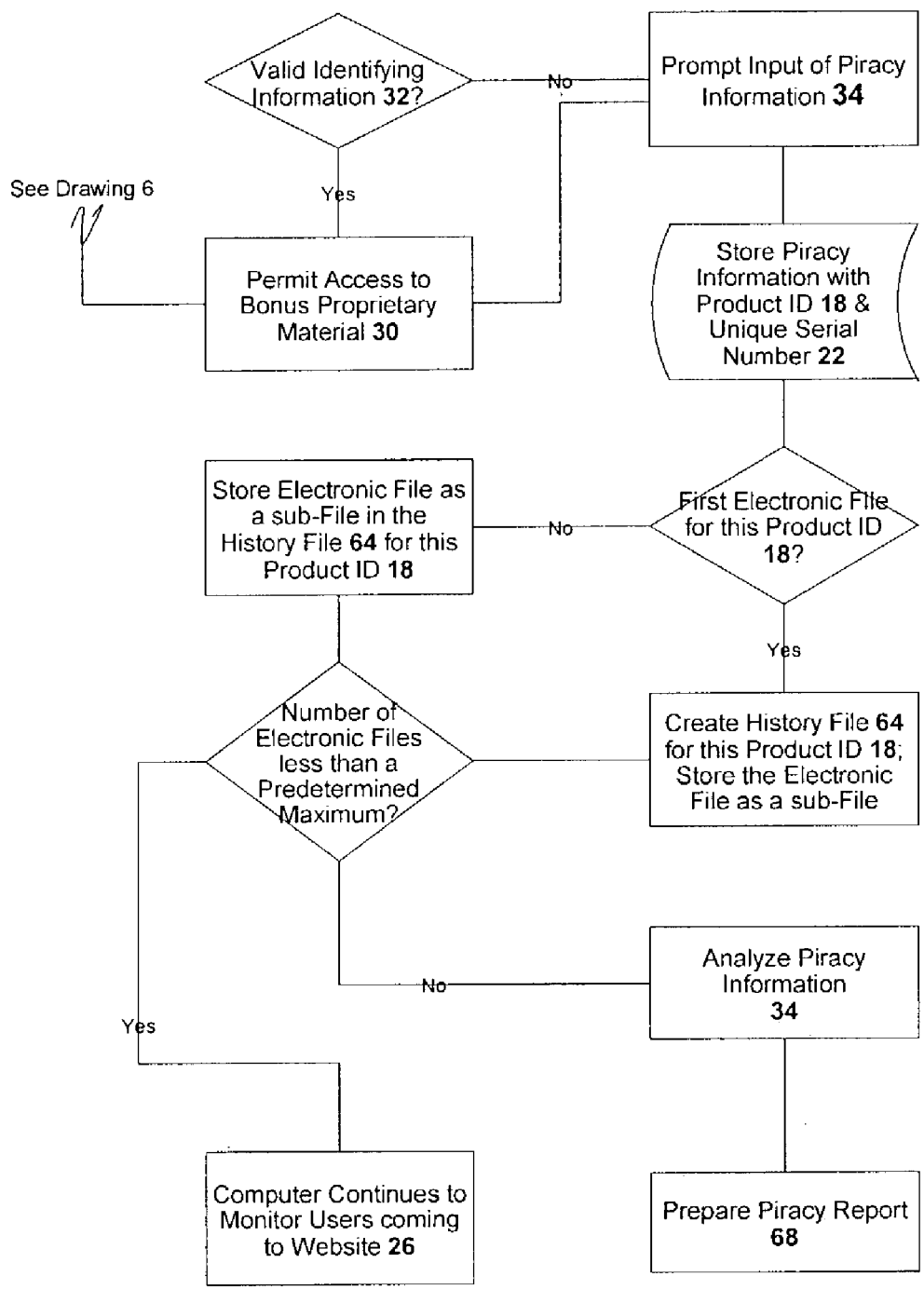
FIG. 7 is a flow chart diagram of piracy reporting steps according to embodiments of the present invention.

Referring now to FIG. 5, a website 26 is provided for interfacing with users 28 with regard to the proprietary materials 12 provided on the media product 14. To entice users 28 to interface with the website 26, bonus proprietary material 30 is selectively provided via controlled access to the website. The controlled access is achieved using the combination of the product identification number 18 and the serial number 22 for each consumer copy 20. As shown in FIG. 6, using these numbers properly, a user 28 can selectively access the bonus proprietary material 30. In one embodiment, the website 26 and computer means 46 thereon prompt the user 28 to input both the product identification number 18 and the serial number 22 to control access to the bonus proprietary material 30. In other embodiments, one or both numbers 18, 22 are encoded on the media product 14 and are input directly via the executable file 40. Only a valid combination of these numbers, i.e. a validly existing product identification number 18 and an associated valid serial number 22 that has been assigned to a consumer copy 20 having that product identification number, will provide further access. Accessing the bonus proprietary material 30 as selected by the user 28 comprises downloading such material and saving it to an electronic storage file identified by the user 28, or simply having such material 30 presented live to the user via the website 26.

A website 26 and means for establishing and providing a website are generally known in the art. In one embodiment, the website 26 further comprises computer means 46 for ensuring that a user or the media product 14 (via the executable file 40) inputs a valid product identification number 18 associated with a valid serial number 22. In other embodiments, the website 26 further comprises computer means 48 for ensuring that each user 28 of the website is associated with identifying information 32 that is assigned to each associated product identification number 18 and serial number 22. In yet other embodiments, the website 26 further comprises computer means 50 for compiling information 34 relative to tracking piracy in the event that a user 28 is determined to not be associated with identifying information 32.

Computer means for these steps 46, 48, 50 involved in the embodiments of the method 10 disclosed herein are generally achieved via software programming. Generation of software programming that performs these various steps 46, 48, 50 is known in the art and will be obvious to programmers provided with this disclosure.

A user 28 may be informed of or referred to the "home" website 26 for a particular media product 14 in several ways. In one embodiment, the executable file 40 created for the media product 14 provides commands directing an internet browser 52 on a computer to open to the home website 26 when the media product 14 is utilized in a CD-ROM or DVD component of a computer. In other embodiments, the web address for the home website 26 is provided with the product identification number 18, such as printed on the front side 401 of an album cover insert 400 for a music CD media product (see FIG. 11). In yet other embodiments, the web address for a general website becomes known to users of similar media products, which general website directs users 28 visiting it to the home website 26 for the particular media product 14.

Referring now to FIG. 6, a user 28 visiting the "home" website 26 for the particular media product 14 will be prompted to provide the product identification number 18 for the media product 14 and the serial number 22 for the consumer copy 20 supposedly in the user's possession or control. Alternatively, the executable file 40 of the media product inputs these numbers. Either when the user 28 enters the website 26 or when the user is prompted or inputs these numbers 18, 22, an error count 54 is initiated having an initial value of zero. The error count 54 tracks the number of erroneous entries made by the user regarding these numbers if the numbers are not input by the executable file 40.

Computer means 46 are provided with the website 26 for receiving the numbers 18, 22 input by the user or by the media product executable file 40 and ensuring that an existing product identification number combined with a valid serial number that has been assigned to a consumer copy having that product identification number are being provided. The numbers input are compared to the master list 44, which is electronically accessed by the website 26. The input product identification number is first validated by ensuring that such a product identification number exists. If the number input matches a product identification number on the master list 44, then the serial number input is validated by finding a match with a serial number contained on the master list under the particular product identification number. Only if both numbers input match numbers contained on the master list 44 and associated with each other will the user 28 be permitted to selectively access bonus proprietary material 30 related to the media product 14.

If either or both of the numbers input do not match with any numbers contained on the master list, an input error is detected and the error count 54 is increased by one. The software programming associated with this number validating step may include an error count maximum 56 having a pre-determined value at which the website 26 terminates the visiting session initiated by the user 28. For each time an input error is detected and the error count 54 increases by one, the website programming compares the new error count against the error count maximum value. If the new error count is equal to or less than the error count maximum, the user is informed by an error message 58 that the numbers input are invalid and is prompted to re-input the numbers, which restarts the number validating process described above. If the new error count is greater than the error count maximum, the website 26 terminates the user's visiting session at the website. Absent error or malfunction, numbers 18, 22 input by a media product executable file 40 will not require an error message 58.

If and when the product identification number 18 and the serial number 22 for the consumer copy 20 are validated as set forth in the above embodiments, computer means 48 then ensure that the user 28 is associated with identifying information 32 that has been assigned to the product identification number 18 and serial number 22 that have been validated. First, the computer means 48 performs an internal query to ascertain whether identifying information 32 has yet been assigned to the validated numbers 18, 22. If not, the user 28 is prompted to provide such identifying information. Such identifying information 32 is then assigned to the validated numbers 18, 22 by storing the newly provided identifying information in association with those numbers. In one embodiment, the identifying information 32 is incorporated into the master list 44. The user 28 is then permitted to selectively access the bonus proprietary material 30.

If it is ascertained that identifying information 32 has previously been provided by a user (whether or not the current user) and assigned to the validated numbers, then the current user is prompted to input identifying information for comparison against that which has already been assigned, to ensure the user 28 is properly associated with the previously assigned identifying information 32. If the information input by the user does not match the information previously assigned, a potential instance of piracy is detected and computer means 50 for compiling piracy information 34 is initiated.

Identifying information 32 can be any information desired. In one embodiment, the identifying information 32 is an e-mail address of the user. In other embodiments, the identifying information 32 is a password selected by the user. In yet other embodiments, the identifying information 32 is the internet protocol (IP) address utilized by the internet browser 52 on the user's computer, and the prompting step for obtaining this information is communicated to the user's computer directly without active input required directly from the user, such as by a "cookie" 60 deposited by the website 26 on the user's computer.

Software programming comprising the computer means 50 for compiling piracy information may prompt the user 28 to provide piracy information 34, including personal or other demographic information about himself or herself. In other embodiments, this programming comprises communicating with the user's computer directly without active input from the user, such as by a "cookie" 60 deposited by the website 26, to glean additional piracy information 34 about the user and/or the user's computer or internet browser 52 IP address. An electronic file 62 is created for storing any such piracy information 34 input by the user and/or gleaned from the user's computer. The piracy information 34 is stored in the created electronic file 62 which is identified by or otherwise associated with the product identification number 18 and/or the serial number 22. In one embodiment, the information 34 prompted for is the user's name and address. In other embodiments, the information 34 prompted for is the location from which the user obtained the consumer copy 20 of the media product 14. In yet other embodiments, the information 34 is prompted for relatively innocuously as being associated with inductive incentives offered to the user 28, such as offers for apparel, additional proprietary material, concert ticket offers, deals, information or programs, or sundry items in connection with the media product 14.

In one embodiment, once piracy information 34 is collected and compiled, the user 28 is permitted to selectively access the bonus proprietary materials 30, regardless of the input of non-matching identifying information 32. In other embodiments, the website 26 further creates a history file 64 identified according to the product identification number 18 and stores as sub-files therein each electronic file 62 crated for storing piracy information 34 in connection with that product identification number. In yet other embodiments, a piracy report 68 is prepared and provided to the owner or controller for each electronic file 62 created. In yet other embodiments, the owner or controller of the proprietary material 12 designates a maximum 66 for the number of electronic files 62 that are stored in the history file 64 before a piracy report 68 is prepared and provided to the owner or controller.

A piracy report 68 may summarize all factual information 34 available in the history file 64 or it may detail each electronic file 62 according to the piracy information 34 obtained. In other embodiments, a piracy report 68 identifies the sequence number 24 for each serial number 22 included in an electronic file 62 or history file 64. In yet other embodiments, a piracy report 68 provides analysis of the piracy information 34 regarding scope and type of potential piracy detected.

Based on the piracy information obtained, which is then associated with the product identification number 18 and serial number 22 of the consumer copy 20 which the user 28 presumably owns or possesses, one may analyze whether piracy of the proprietary material 12 has occurred, and if so what type of piracy has occurred. A network of relationships is established between users, retailers and distributors/wholesalers as a result of the piracy information obtained, product identification number, serial numbers, and sequence numbers. Analysis of the various facets of this network helps determine whether and what type of piracy may have occurred.

In one embodiment, piracy comprises "friends sharing with friends" activity. This is identified by an unusually high number of instances that a particular combination of product identification number 18 and serial number 22 is validated but access to the bonus proprietary material 30 is not made when the website prompts for identifying information 32.

In other embodiments, piracy comprises potential retailer piracy activity. This is identified by an unusually high number of attempts to access bonus proprietary material 30 by users 28 who provide non-matching identifying information 32, but who also provide piracy information 34 that indicates similarities, such as a particular retail location, among piracy information input by other users from whom other instances of potential piracy have been detected, such as may be contained in a history file 64 or electronic file 62 recording instances of piracy in connection with the particular product identification number 18 and/or serial number 22.

In yet other specific embodiments, piracy comprises potential wholesaler or distributor piracy activity. This is identified by an unusually high number of attempts to access bonus proprietary material 30 by users 28 who provide non-matching identifying information 32, but who also provide piracy information 34 that establish one or more patterns suggesting that a particular distributor or wholesaler is manufacturing unauthorized copies of the media product 14. Patterns may include several history files 64 of compiled piracy information 34 establishing a particular range of sequence numbers 24 for a set of serial numbers 22 that the owner or controller of the proprietary material 12 knows or can establish were sold by or through a particular wholesaler or other distributor.

Systematic piracy of a particular media product 14 may be indicated by a large number of instances of potentially detected piracy involving the particular media product over a discrete range of serial numbers for a particular product identification number or over a diverse geographic range where potential piracy of the supposedly same consumer copy (according to product identification number and serial number) occurs. Narrower pirating activity may be indicated by a large number of instances of potentially detected piracy involving one or only a few serial numbers for a particular product identification number within a particular geographic region. The analysis of the pirating activities can help focus the efforts of law enforcement agencies.

The following is an example of one embodiment of the method of detecting piracy of proprietary materials. The example is illustrated in FIGS. 8-11, and is provided for a multi-media music CD having video tracks provided with the music tracks:

EXAMPLE

Generally, depending upon CD format, a typical CD published with a proprietary musical performance can contain up to 74 minutes of performance with the average length of the performance being 60 minutes. The performance can contain any number of audio tracks, but generally contains from 10 to 16 musical tracks—each track containing a different song or performance. When the series of performances is copied and packaged with a nice cover and a plastic case or protector, a CD album is created and the album is ready to enter the marketing, distribution, and sales channels. For comparative purposes, the album in this example will have 16 tracks.

In addition to the 16 tracks, 2 or perhaps 3 videos, some "live recording" video made when the album was being recorded, some "outtakes", and several interviews with the performing artist(s) may also be included on the CD. Other tracks, video tracks, studio video recordings, out takes, and interviews are also made available at the home website for the multi-media CD product. These materials are the bonus proprietary material for this multi-media CD product.

Figure 8:
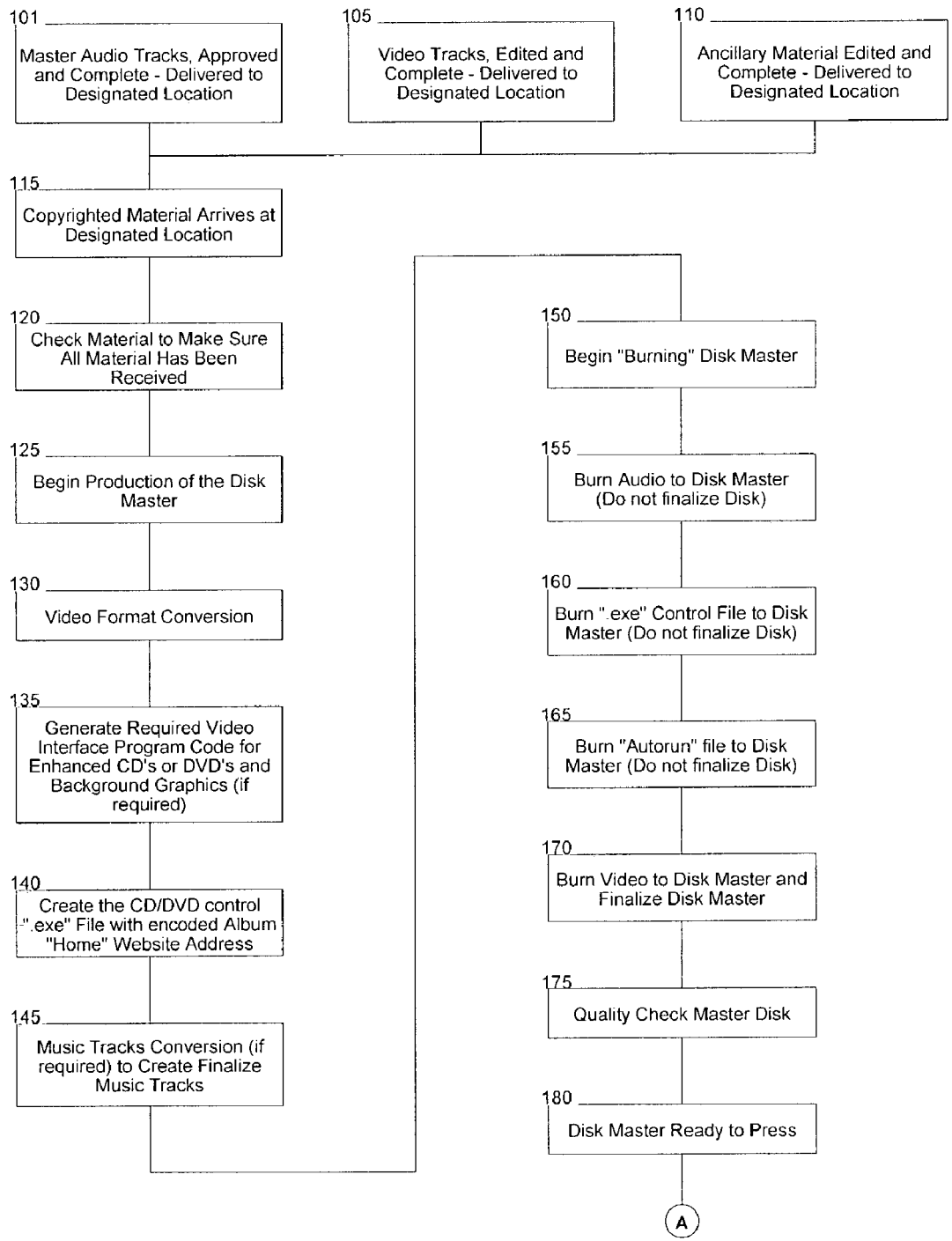
FIG. 8 shows a flow chart diagram of steps for creating a master copy of the media product in the Example, containing proprietary music and video tracks to be protected from piracy according to the embodiments of the invention.

Referring to FIG. 8, the final mastered audio tracks are delivered 101 by any appropriate delivery method to the designated location where the master copy of the multi-media CD product is to be finalized. The final video tracks are similarly delivered 105 to this location. Also, ancillary material comprising the interviews, outtakes, etc. are also delivered 110. At arrival 115, each of these media tracks are checked and logged in 120, and production is begun on creating the master copy 125.

The mastering process begins with conversion. Video conversion 130 comprises conversion of any analog video to digital format, and finally converting the video to a suitable digital format. Next, the video interface program code is generated 135. This code is designed to control the flow and presentation of the video material. Background graphics used as a back drop for the control screen generated by the program code may also be provided. If no background graphics are provided, standard background screens may be used in the master copy. Next, the program code is run and debugged, and the program statements are compiled 140 into an executable file which shall become the CD control file. In this executable file, program statements discretely identify the home website for the finished multi-media CD product. If the product is copied, a pirate cannot simply duplicate the website to avoid pirated copies from being detected because the controller of the proprietary material or the provider of the monitoring services will have already established the website using the provided web address. That a user is directed to the home website via a pirated copy of the multi-media CD product cannot be avoided by a pirate.

Next, the mastered music tracks are converted 145 to the correct music format. Music can arrive in analog format or any one of several digital formats and the conversion changes the music format to the correct format for the application desired for the multi-media CD product.

Next, the music tracks, video tracks, and ancillary materials are copied by a process known as "burning" onto a CD 150. The CD created is the master copy from which all further copies are generated. The master audio tracks are burned to the master copy 155 without finalizing the CD, the executable file is burned to the master copy 160 without finalizing the CD, an autorun file in burned to the master copy 165 without finalizing the CD, and the video material is burned to the master copy 170. Once the final item is copied to the master copy, the master copy is finalized.

The master copy should be checked 175 to ensure that all the material desired to be included in the product is indeed included, and the master copy is checked to make sure that it performs properly. The master copy is then ready to "press" the consumer copies 180.

Product identification numbers, serial numbers, and a product specific website address are provided to consumers on album covers as shown in FIG. 11.

Figure 9:
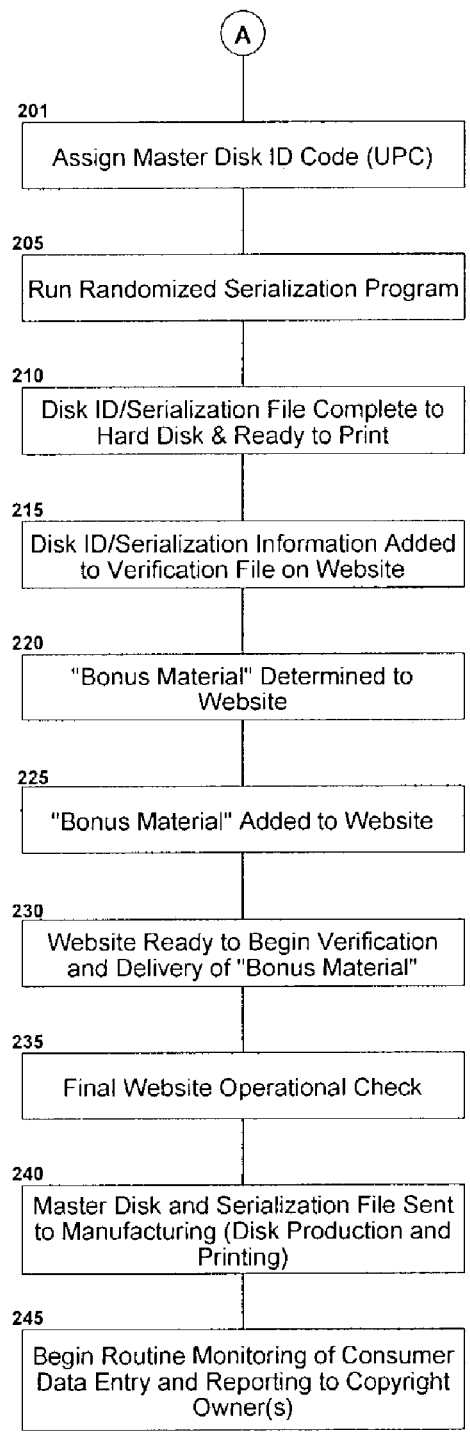
FIG. 9 shows a flow chart diagram of steps for serializing consumer copies of the media product of the Example and for preparing a website for use in detecting potential piracy according to the embodiments of the invention.

Referring to FIG. 9, the product identification number is provided for the particular multi-media CD product 201. For each separate product, a separate product identification number is assigned. A serialization program is run 205 for generating ten-digit serial numbers having a high number base. Several consumer copies as desired are manufactured from the master copy, each consumer copy having a serial number encoded thereon, and the consumer copies are then made available on the market through any distribution means desired. A master list of the product identification number and all several numbers assigned thereunder is then completed 210, and is made electronically accessible to various computer means of a website 215. Bonus material is then determined 220, provided via controlled access on the website 225, the website completed 230 and checked 235. Materials such as the master copy and master list are safely kept in one or more places, such as with the party manufacturing consumer copies 240. The detection and monitoring of piracy is then ready to begin 245.

Figure 10:
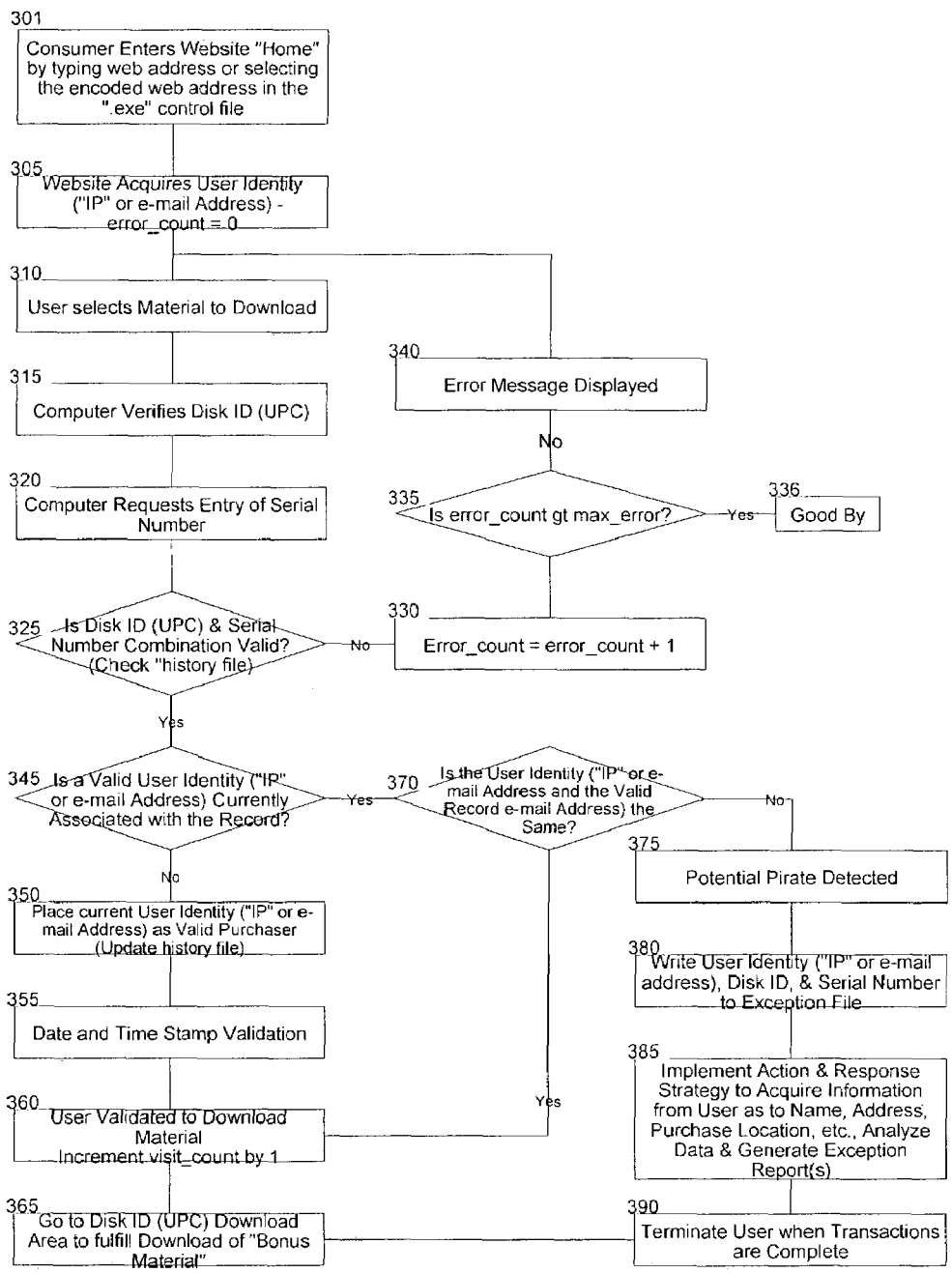
FIG. 10 shows a flow chart diagram of steps for using the website of FIG. 2 for verifying valid serial numbers and identification numbers for each consumer copy of the media product of the Example, authenticating users of the website, providing access to bonus proprietary material in connection with the consumer copies, and monitoring potential piracy according to the embodiments of the invention.

Referring to FIG. 10, the purchaser of a consumer copy may go to the home website to access the bonus material provided in connection with the particular multi-media CD product 301. The software programs running at the website manage the user activities, validate the product identification number and serial number assigned to the particular consumer copy and encoded thereon, save the e-mail address or other identifying information, time and date stamps each visit to the website by the user, and increments an optional visitation counter by the integer one. Access to bonus proprietary material is controlled via steps 305-390 in FIG. 10. The initial combination of identifying information, product identification number, and serial number is the only authorized user identification that will provide unrestricted permission to access bonus materials for that consumer copy of the multi-media CD product.

Piracy reports 68 in one embodiment are utilized for detecting piracy. In other embodiments, piracy reports 68 indicate scope of piracy geographically as well as economically. Indications of economic scope additionally track monetary losses for which tax benefits are available to owners or controllers of proprietary material 12.

While specific embodiments of the invention have been shown and described herein for purposes of illustration, the protection offered by any patent which may issue upon this application is not strictly limited to the disclosed embodiment; but rather extends to all structures and arrangements which fall fairly within the scope of the claims which are appended hereto:

What is claimed is:

1. A method for detecting piracy of proprietary material comprising the steps of:
   providing a master copy of a media product, said media product comprising said proprietary material;
   assigning a product identification number to said media product;
   generating a plurality of serial numbers;
   manufacturing a plurality of consumer copies from said master copy;
   assigning one said serial number to each said consumer copy associated with said product identification number;
   sequentially assigning a sequence number to each said serial number;
   providing said product identification number and said serial number with each said consumer copy;
   providing a website for interfacing with users in connection with said media product, said website comprising
      computer means for ensuring input from each said user of a valid product identification number and an associated valid serial number,
      computer means for ensuring said user is associated with identifying information assigned to said product identification number and its associated said serial number, and
      computer means for compiling piracy information if said user is not associated with said identifying information; and
   analyzing said piracy information to determine a potential instance of piracy of said proprietary material.

2. The method of claim 1 wherein said master copy comprises one or more media files for use with one or more media components, an executable file for use with a computer, and an autorun file.

3. The method of claim 1 wherein said media product is selected from the group of products consisting of music CD's, music CD's with video, movie DVD's, music audio cassette tapes, movie video cassette tapes, super-CDs, DVD audio discs, memory cards, software floppy discs, software CD's, video game cartridges, and video game CD's.

4. The method of claim 1 wherein said proprietary material comprises copyrighted or copyrightable works of authorship.

5. The method of claim 1 wherein said product identification number comprises a UPC code identifying each said consumer copy as said media product.

6. The method of claim 1 wherein each said serial number comprises a ten digit number having a high number-base system.

7. The method of claim 6 wherein said ten digit number comprises alpha-numeric/symbolic digits, said high number base system comprising a number base greater than about 10.

8. The method of claim 1 wherein said sequence numbers are selected from whole numbers starting from 1 to 99,999,999, each said serial number being identified by a single said sequence number.

9. The method of claim 1 wherein providing said product identification number and said serial number with each consumer copy comprises printing said numbers on packaging associated with each said consumer copy of said media product or printing said numbers on human readable material (and providing said material with each said consumer copy.

10. The method of claim 9 wherein said media product comprises a music CD or a music CD with video, said packaging comprising an album cover insert having a front side and a back side, said serial number being printed on said back side.

11. The method of claim 10 further comprising a web address for accessing said website printed on said front side.

12. The method of claim 1 wherein interfacing with said website comprises accessing bonus proprietary material provided through said website and generally related to said media product.

13. The method of claim 1 wherein said computer means for ensuring input of a valid product identification number and an associated valid serial number comprises software programming, said software programming performing the steps of: prompting said user to input said product identification number assigned to said media product and said serial number assigned to a particular said consumer copy, comparing numbers input by said user against a master list of each said serial number assigned for said media product having said product identification number, providing said user with further access to said website if said numbers input by said user match with a product identification number and associated valid serial number on said master list, and increasing an error count by 1 if said numbers input by said user do not match with a product identification number and associated valid serial number on said master list, said error count having an initial value of zero and being initiated at or prior to said prompting step, said software programming further performing the step of terminating access of said user to said website if said error count exceeds a predetermined error count maximum.

14. The method of claim 13 wherein said master list comprises a list containing all said serial numbers assigned to said consumer copies and associated with a particular said product identification number, said comparing step comprising the steps of: ensuring an existing product identification number is contained on said master list as input by said user, and if so then ensuring a valid serial number is contained on said master list for said existing product identification number, a negative response to either said ensuring step signaling no match, a positive response to both said ensuring steps signaling a match.

15. The method of claim 1 wherein said computer means for ensuring said user is associated with identifying information comprises software programming, said software programming performing the steps of:
ensuring identifying information has been assigned to said product identification number and said serial number, and
if not then
prompting said user to provide identifying information and
assigning said identifying information to said numbers by storing said identifying information in association with said numbers, and
if so, then
prompting said user to input said identifying information and
comparing said input identifying information with said identifying information previously assigned.

16. The method of claim 15 further comprising providing said user with additional access to content on said website if said identifying information input by said user matches said identifying information previously assigned to said numbers, and initiating said computer means for compiling piracy information if said identifying information input by said user does not match said identifying information previously assigned to said numbers.

17. The method of claim 1 wherein said computer means for compiling piracy information comprises software programming, said software programming performing the steps of:
creating an electronic file,
prompting said user to input personal or demographic information about said user,
storing said personal or demographic information in said electronic file, and
storing said product identification number and said serial number in said electronic file.

18. The method of claim 17 wherein said personal or demographic information comprises said user's name, address, and a location identified as a retail source from which said consumer copy having said product identification number and said serial number was obtained.

19. The method of claim 1 wherein said identifying information comprises an internet IP address for a computer used by said user to access the Internet, a password selected by said user, or an e-mail address of said user.

20. The method of claim 1 wherein said analyzing step comprises comparing said piracy information with piracy information compiled in other instances for said media product having said product identification number, identifying similarities therebetween, and identifying one or more patterns from said similarities.

21. The method of claim 1 wherein each said consumer copy comprises at least one of said product identification number and said serial number being encoded thereon.

22. The method of claim 1 further comprising preparing a piracy report, said piracy report setting forth at least one of facts and analysis regarding said piracy information.

23. The method of claim 22 wherein said piracy report is prepared after a pre-determined number of potential instances of piracy have been detected with regard to said media product.

24. The method of claim 22 or 23 wherein said piracy report further comprises analysis of economic scope of piracy relevant to tracking monetary losses from piracy of said proprietary material for which said losses tax benefits are available.

* * * * *